(12) United States Patent
Pharoah et al.

(10) Patent No.: US 6,831,965 B2
(45) Date of Patent: Dec. 14, 2004

(54) METHOD AND APPARATUS FOR TESTING TELEPHONE LINES

(75) Inventors: Marshall William Pharoah, Canton, NY (US); Wilbur A. Carpenter, Canton, NY (US)

(73) Assignee: Mitel Knowledge Corporation, Kanata (CA)

(*) Notice: Subject to any disclaimer, the term of this patent is extended or adjusted under 35 U.S.C. 154(b) by 303 days.

(21) Appl. No.: 09/938,130

(22) Filed: Aug. 23, 2001

(65) Prior Publication Data
US 2003/0039335 A1 Feb. 27, 2003

(51) Int. Cl.⁷ .......................... H04M 1/24; H04M 3/08
(52) U.S. Cl. .............. 379/22; 379/1.01; 379/22.04; 379/22.07; 379/26.01
(58) Field of Search .............. 379/1.01, 9, 9.02, 379/9.06, 14, 10.01, 12, 15.01, 21, 22, 22.04, 22.07, 26.01, 26.02, 27.01, 27.04, 29.01, 29.03, 29.06, 29.1, 31; 324/500

(56) References Cited

U.S. PATENT DOCUMENTS

| | | | | |
|---|---|---|---|---|
| 3,892,928 A | * | 7/1975 | Casterline et al. | 379/12 |
| 4,544,809 A | * | 10/1985 | Stuparits et al. | 379/27.01 |
| 4,841,560 A | * | 6/1989 | Chan et al. | 379/29.01 |
| 5,003,573 A | * | 3/1991 | Agah et al. | 379/27.01 |
| 6,160,871 A | * | 12/2000 | Duree et al. | 379/9 |

* cited by examiner

Primary Examiner—Quoc Tran
(74) Attorney, Agent, or Firm—Fay, Sharpe, Fagan, Minnich & McKee, LLP

(57) ABSTRACT

The present invention relates to an apparatus for testing connection of customer premise equipment to a trunk, comprising a user interface for receiving user commands from a remote location, memory registers for storing indications of trunk type and status, and a controller for initiating automatic trunk tests responsive to the user commands and in response storing the indications of trunk type and status in the memory registers and outputting the indications to said interface.

16 Claims, 5 Drawing Sheets

Trunk Test Sequence

METHOD AND APPARATUS FOR TESTING TELEPHONE LINES

FIELD OF THE INVENTION

The present invention relates in general to telephone testing equipment, and more specifically to a method and apparatus for remote verification of trunk operation without requiring the use of an external device.

BACKGROUND OF THE INVENTION

Telephones are traditionally connected to the Public Switched Telephone Network (PSTN) through a pair of wires running from home or office to the Telephone Company Central Office (CO).

There are two basic types of analog Central Office trunks: loop start (LS) and ground start (GS), although other less common types are available. Both types of trunks use two wires that are termed Tip and Ring to provide the signaling but use different electrical signaling mechanisms to "start" the line. In addition, ground start lines are polarity sensitive while loop start lines are not. Audio is transmitted over the lines in a mode using amplitude modulated differentially balanced signals. Other signaling carried by the lines includes ringing and Dual Tone Multi-Frequency (DTMF) digits dialed by the subscriber. The foregoing describes what is commonly known as Plain Old Telephone Service (POTS). For each additional telephone, another pair of wires must be used.

Digital Subscriber Loop (DSL) trunks are used to transfer data packets to home and office at rates of up to 2 Mbps. These packets may contain data, such as may be received from an Internet connection and/or multiple channels of digitized voice data. Whereas in the past a single pair of wires supported only a single voice or data connection with Customer Premises Equipment (CPE) such as a telephone or PC, the advent of DSL permits multiple virtual voice and data connections over a single DSL line. A device known as an Integrated Access Device (IAD) de-multiplexes the voice channels and converts them back to analog POTS lines, while also providing a connection for the data channels to a Local Area Network (LAN).

When telephony devices are installed, the installer must ensure that the lines are connected to the proper interface with the proper polarity. Additionally the installer must program the devices (electronically or mechanically) to indicate which line type is connected (i.e. loop start or ground start).

Traditionally, Customer Premise Equipment (CPE) devices such as telephones had no field programmable requirements. As the industry advanced, switches or jumpers were used to handle simple programming requirements. The addition of microprocessors and microcontrollers to CPE devices has created a requirement for field programming, which has generally been handled by connecting a Dual Tone Multi Frequency (DTMF) telephone to the CPE. A unique password is entered via DTMF in order to gain access to a programming mode of the CPE. In this mode, unique combinations of digits indicate certain actions to be performed. Also, values stored in internal non-volatile memory fixed locations, typically known as registers, may be accessed during normal operation to provide information on how certain actions should be performed. Unique combinations of dialed digits can also be used to trigger specific actions without entering program mode. Text based computer terminals connected to a local digital data port have also been used to gain access to the programming mode. This, in turn, has led to the deployment of remotely accessible data ports via modems connected to a POTS line. With the introduction of the Internet and the World Wide Web (WWW), it has become common for CPE devices to feature a data network connection and to provide graphical programming and data display using web pages. It is therefore desirable to provide a tool for simple programming of the CPE using any of the existing methodologies as well as text based programming using a Telnet connection or WWW access over the Internet.

SUMMARY OF THE INVENTION

According to the present invention, an IAD is provided which ensures correct connection to the CO trunk using only a minimum of tools. Once connected, the device may be remotely activated to test the trunk and communicate the results of the test to a remote location. Trunk tests may be triggered in a number of ways. They may be triggered by a power on cycle, or by a unique programmable code entered from a DTMF telephone. A text based computer terminal attached to the serial data port of the apparatus may also trigger tests. Alternatively, tests may be remotely triggered by a Web browser attached to the serial data port, by Telnet or by a Web browser connected to the World Wide Web (WWW). The results of such tests may be determined by observing integrated LEDs on the apparatus, by a locally generated message that is transmitted via an integrated modem over a POTS line or by a remote query from the Internet via Telnet or WWVV Web pages.

BRIEF DESCRIPTION OF THE DETAILED DRAWINGS

A description of a preferred embodiment of the present invention is provided herein below with reference to the accompanying drawings in which.

DETAILED DESCRIPTION OF PREFERRED EMBODIMENT

Figure 1:
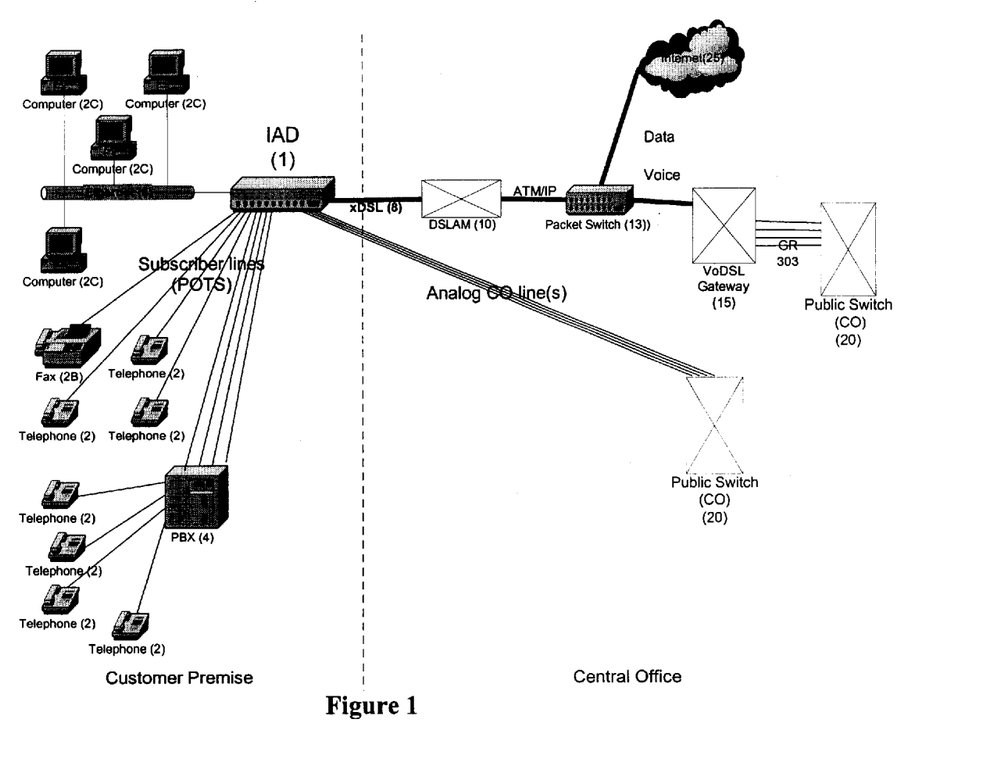
FIG. 1 is a schematic representation of an Integrated Access Device (IAD) according to the present invention connected to Customer Premises Equipment (CPE) lines in a typical installation.

With reference to FIG. 1, IAD 1 provides multiple voice/data interfaces to other CPE such as telephones 2 and fax machines 2B, via the subscriber lines (POTS) or through a PBX 4. It also provides an Ethernet port 6 for connection to various computing devices 2C. The voice signals from the telephones are multiplexed with the data from the Ethernet port and transported over the xDSL 8 to the DSLAM 10 using ATM protocol. The DSLAM 10 forwards the voice/data packets to a packet switch 13, which separates the voice and data. The data is sent to the Internet 25 (or other network) and the voice is sent to a Voice over DSL gateway 15, which forwards the voice data to the Public switch or Central Office 20, typically via GR303 lines.

Analog CO lines also extend from the IAD 1 to provide POTS service to the Public Switch 20, which may or may not be the same switch as interfaced to the VoDSL gateway. These lines provide for emergency services in the event of equipment failures, as well as local access.

Figure 2:
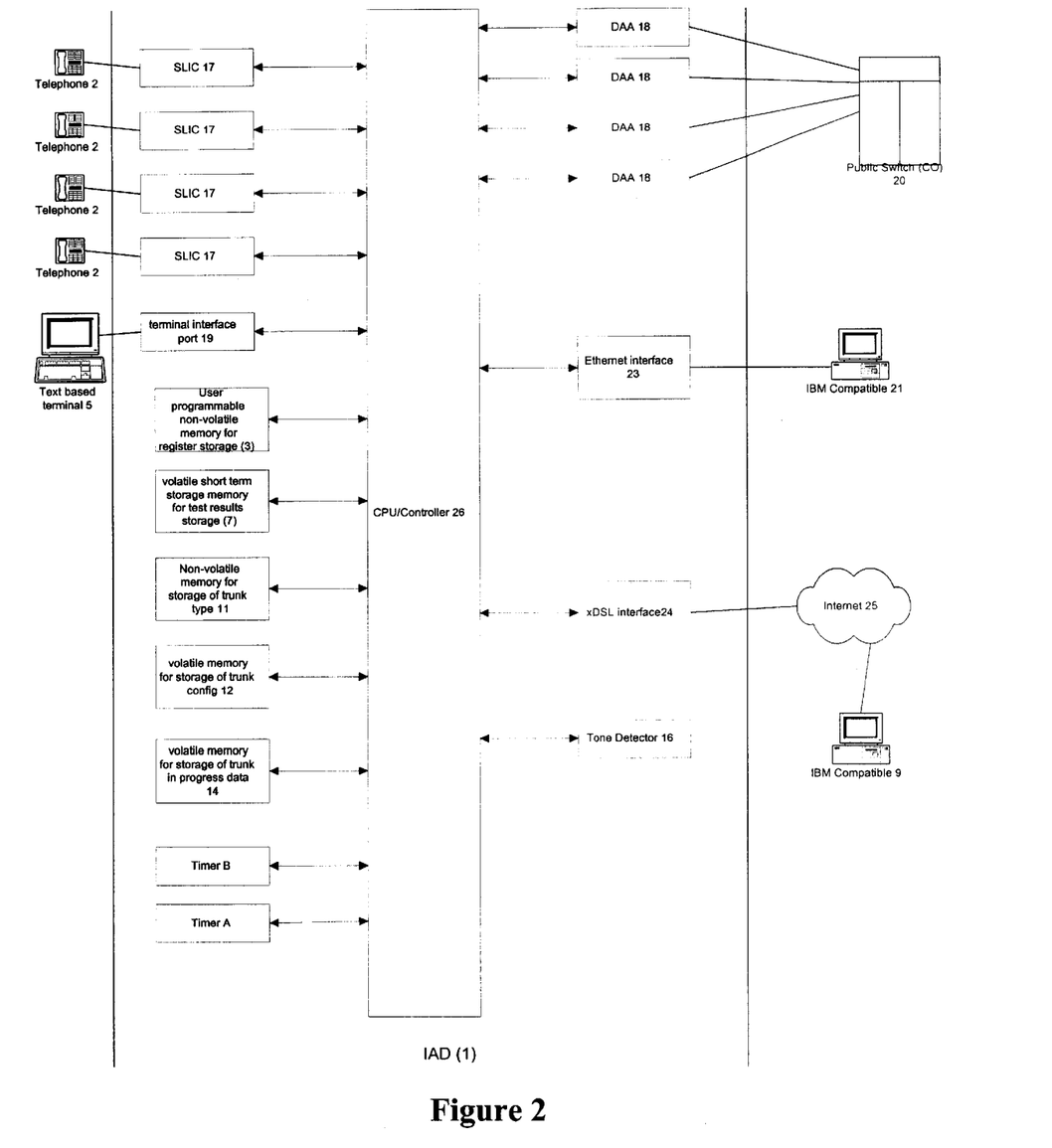
FIG. 2 is a block diagram showing functional components of the IAD according to the preferred embodiment.

Turning to FIG. 2, IAD 1 is shown in greater detail comprising a number of interfaces including analog and digital telephony and data communications ports which operate in accordance with the steps set forth in the flowchart of FIG. 4, discussed in greater detail below. As shown in FIG. 1, a plurality of telephones 2 provide Plain Old Telephone Service (POTS) via respective Subscriber Line Interface Circuits for translating the analog telephone signals into digital signals which can be read and controlled by a CPU 26. These signals include off hook detection, ringing generation, among others.

The Central Processing Unit 26 executes a stored program memory, controlling the operation of the IAD 1, as discussed in greater detail below with reference to FIG. 4.

Customer database 3 is stored in non-volatile memory (typically FLASH or EEPROM) internal to the IAD 1. The customer modifies the database through a program mode to make changes in the operation of the IAD 1, as discussed in greater detail below.

A text-based terminal 5 is used to interface to the IAD 1 to access the customer database 3. Serial interface port 19 is used to interface the text based terminal 5 (or PC emulating one) to the IAD 1.

Test results are stored in an internal volatile memory 7 of the IAD 1. Each trunk has a specific area of memory allocated, and part of that allocation is used to store the current test progress and results while testing.

As discussed in greater detail below, a remote PC 9 located at a remote site may access the IAD 1 via the Internet 25 for remote programming via a web browser.

Trunk type is stored in non-volatile memory 11 as part of the customer database. Each trunk may be individually programmed to be either Loop Start, Ground Start, or to be Auto Configure on power on.

Trunk Config is stored in volatile memory 12. This value is set at power on if the trunk is not programmed to Auto Configure, or at the end of any trunk test that has been performed. Trunk Config data is stored in the RAM location specific to the trunk which it relates to. During normal (non-test) operation of the trunk, this memory location may be accessed to determine which actions should be executed.

Test in progress data is stored in volatile memory 14, which is also in the area of memory allocated to the specific trunk being tested. The trunk consults this memory at certain times during its operation where the functional requirements are different between normal operational and test modes.

Tone Detector 16 analyzes the frequency of audio received from Central Office 20. According to the preferred embodiment, a software function is provided which operates based on four parameters:

Wait time This is the maximum period of time the tone detector will wait for a valid tone to be detected, at expiration of the time allotted the function ceases execution and a fail condition is posted. This value is typically specified in seconds.

Guard time The tone must be within the specified frequency range for this period of time to be declared valid.

Low frequency threshold Tones below this frequency are declared invalid (i.e. some noise immunity is provided).

High frequency threshold Tones above this frequency are declared invalid (i.e. some noise immunity is provided)

Data Access Arrangement circuits 18 translate the analog signals from the Central Office 20 into digital signals that may be read and controlled by the CPU 26. These signals include ringing detection, loop termination, and ground start functions, among others.

A locally situated PC 21 is connected to Ethernet interface 23 and is equipped with a browser for inputting data and reviewing test results, such as discussed with reference to FIGS. 3A and 3B.

In operation, the IAD 1 reserves a block of memory locations 3 in which to store and look up user programmable parameters regarding the operation of various features and actions. Traditionally, these memory locations are each given a unique numeric identifier to act as an aid while the user is in program mode, using for example text based computer terminal 5. The addition of Web programming allows a more user friendly interface in which a text description removes the need for register numbers, as discussed in greater detail below with reference to FIGS. 3A and 3B.

In the direct DTMF dialed digits mode of operation, the IAD 1 stores digits dialed by the telephone 2, and consults the internal user programmed register tables 3 to determine a rule based course of action. The rules are also user programmable, consisting of a subset of actions chosen from a list.

For example, dialing #01 results in a match against the preprogrammed register table 8103 #01#200. In this example, "8" refers to the set of tables used to look up actions based on DTMF digits and the digit "1" refers to a particular subset of those tables. The digits "03" refer to the table size (i.e. the table should be consulted after the third digit has been detected). The digits "#01" refer to the actual digits that are to be matched (in some cases wild cards may be used to refer to a range or specific set of digits). The digits "#200" indicate a specific action to be performed. In the case of the IAD 1, "#200" indicates an action whereby all POTS trunks trigger a self-test.

Other typical actions include:

201 Test trunk 1
202 Test trunk 2
203 Test trunk 3
204 Test trunk 4
210 Force test on all trunks
211 Force test on trunk 1
212 Force test on trunk 2
213 Force test of trunk 3
214 Force test of trunk 4

Additional actions include the ability to modify a specific register, or to select a certain set of dialing rules, or select specific trunks, etc.

In the local text program mode, the text-based terminal 5 is connected to the serial data port of the IAD 1. Pressing the Enter key on terminal 5 causes the IAD 1 to return the character string "password:". Entering the pre-programmed password causes the IAD 1 to enter program mode, and return the character prompt ">". At this point the installer has the option of programming registers (modifying non-volatile data), or entering commands (causing an action of one form or another). A typical command sequence is:

>951 0
>

In this case the ">" is the ready prompt supplied by the IAD 1. The characters "951" designate the command number typed by the installer. The space is a character supplied by the IAD 1 to indicate it recognizes the command. The "0" is typed by the installer as a parameter to the command. In this case "951" indicates performance of a trunk test. The "0" indicates performance of the test on all trunks. In response, the IAD 1 performs the indicated action, and then returns a prompt on the next line to indicate that it is ready to receive another command.

Another typical sequence is:

>952
>

In this case the IAD 1 recognizes the unique three character command "952" and does not expect a parameter. Therefore it executes the action immediately and returns a prompt for the next action.

Typical related commands include:

951 0 Test all trunks
951 1 Test trunk 1
951 2 Test trunk 2
951 3 Test trunk 3
951 4 Test trunk 4
Report the current trunk configuration As discussed above, register data for the registers 3 may also be accessed while in program mode. A typical register modification is:

>10100 02
>

In this case the ">" is the ready prompt supplied by the IAD 1. The digit "1" selects the group of registers 3 which involve trunk parameters. The characters "01" indicate that the parameter is for trunk 1. The characters "00" indicate the individual register, in this case the type of trunk. The space is a character supplied by the IAD 1 to indicate that it recognizes a valid register number. The characters "02" indicate that the IAD 1 should attempt to configure the trunks itself. The IAD 1 updates this register, and returns a prompt on the next line to indicate that it is ready to receive another command or register.

Once the IAD 1 is connected to a network, including the Internet, a Telnet session may be established by which the IAD 1 may be virtually connected to a remote terminal program. This allows programming of the IAD 1 as if from a local terminal connected to the IAD serial port.

Thus, a Web browser on PC 9, or PC21, can be used to establish a connection to the IAD 1 via a network or via the serial port. The browser presents a graphical interface for allowing the installer to test the trunks and to view the test results after completion of the test, as shown in FIGS. 3A and 3B.

Figure 3A:
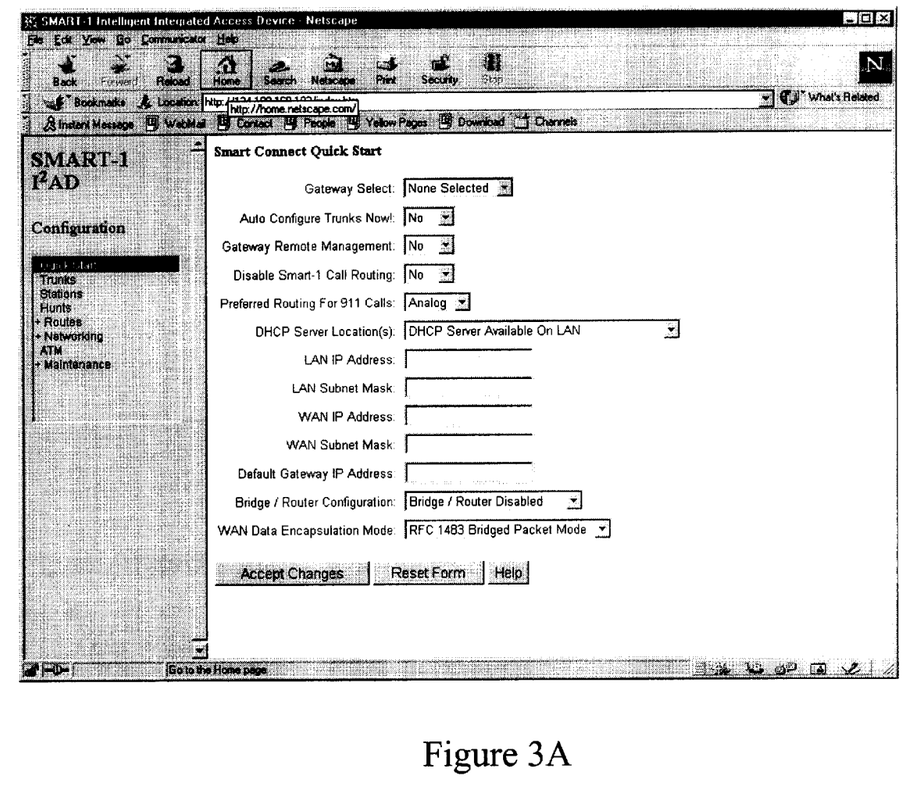
FIGS. 3A and 3B depict Web-based graphical user interfaces showing an example of the manner in which trunks may be tested using the IAD of the present invention.
Figure 3B:
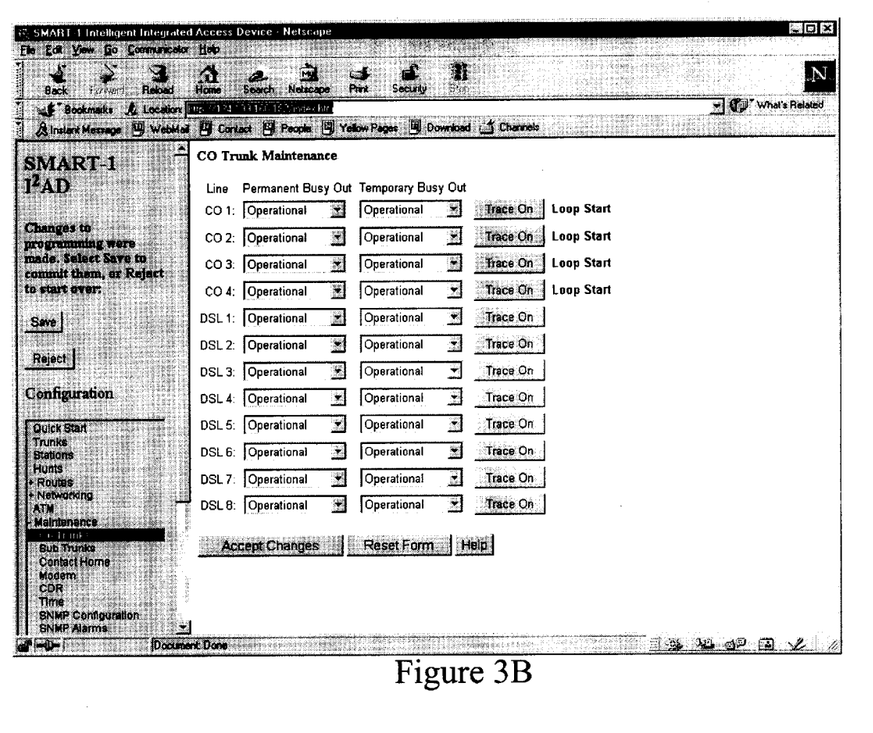

The installer initiates the trunk test in the IAD 1 by selecting the Auto Configure Trunks Now option shown in the web page of FIG. 3A. Once the test has been completed, the results of the test can be viewed with the web browser as shown in FIG. 3B. Although the web page of FIG. 3B is automatically displayed after initiating the test, the screen must be refreshed to allow the installer to monitor the progress of the test until it is complete.

The IAD 1 software uses a Real Time Operating System (RTOS) to control multiple tasks which, as indicated above, may be triggered locally or remotely via direct DTMF access, local text program mode or web programming. The same code base is executed to test each trunk, with respective RAM storage locations 7 to track operating conditions. In other words, the different trunk tests write to the specific RAM area for only those trunks that they wish to test. The trunk test software is organized as a series of states (finite state machine), in which certain actions are completed and decisions made to change to another state, as discussed in greater detail below with reference to FIG. 4.

For each trunk, a value corresponding to the type (TYPE) is maintained in a non-volatile database 11. Valid entries for TYPE include Loop Start (LS), Ground Start (GS), and Auto-Configure.

Also for each trunk, a value corresponding to the configuration (CONFIG) is maintained in volatile RAM 12. At power up, this is set to a value corresponding to AUTO_DETECT. However, the CONFIG value may change to LS, GS, or DISABLED based on the results of the test. The user may also set CONFIG to AUTO_DETECT at any time in order to start another test.

A memory location 14 corresponding to TEST_IN_PROGRESS is set for each trunk when the test is actually started, and cleared when the test is finished.

Trunks may be busy with other operations such as voice calls when the CONFIG value is changed to AUTO_DETECT. In this case, the trunks continue executing and changing states until returned to an idle state, at which time the CONFIG value is checked and the test is started.

During the test, the trunk is first assumed to be LS and tested in that mode. If it passes, then the trunk is detected as LS and is marked as such. If the LS test fails, then the trunk is assumed to be GS and is tested in that mode. If the test passes, then the trunk is detected as GS and is marked as such. If the test fails again, then either there is no connection, or the trunk is connected incorrectly, most probably with reverse polarity.

Figure 4:
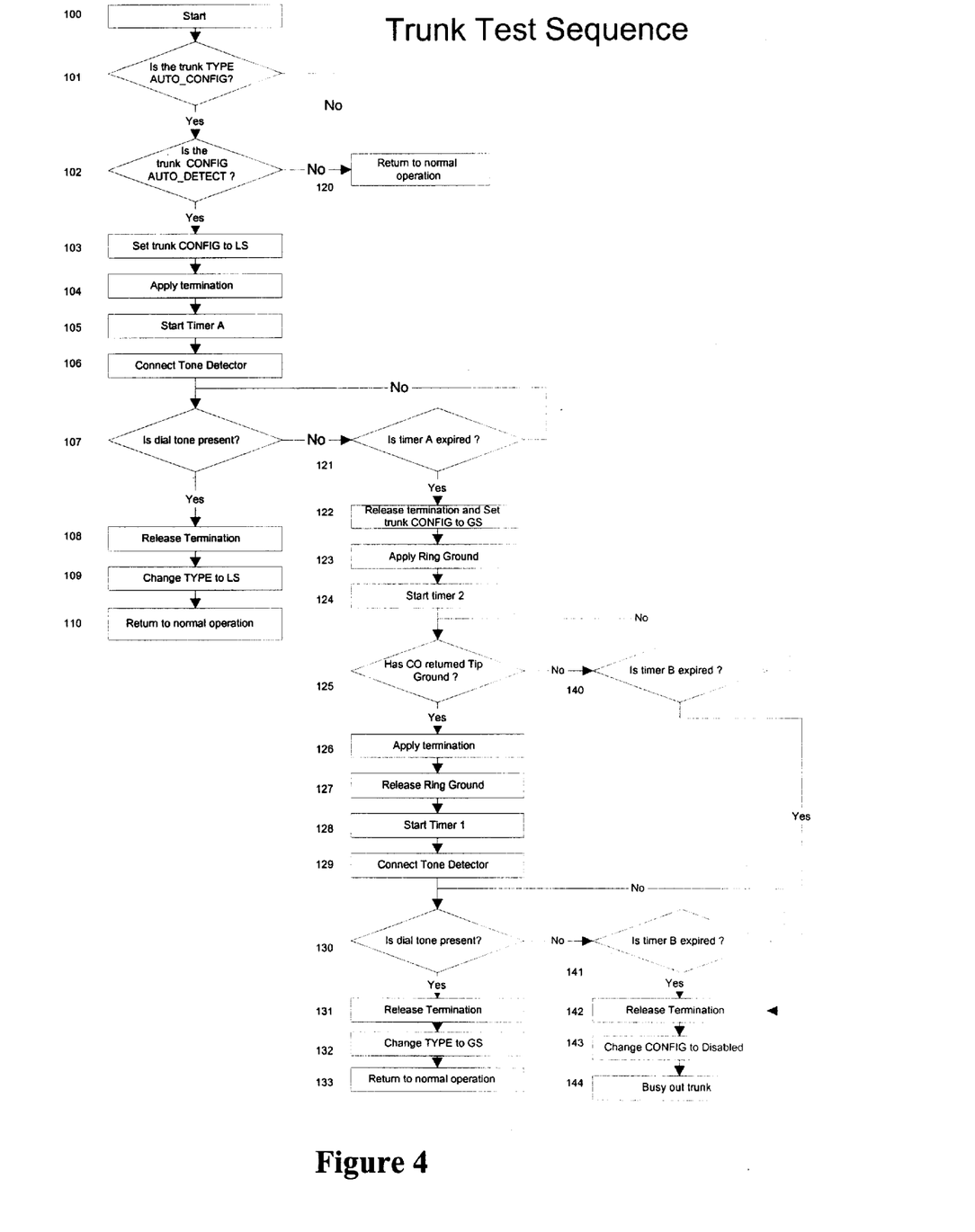
FIG. 4 is a flowchart showing the steps of a trunk test sequence according to the 4 is a flowchart showing the steps of a trunk test sequence according to the preferred embodiment.

The flow chart of FIG. 4 shows the process followed by each trunk when checking the CONFIG/TYPE values and performing the actual test.

In step 100, the trunk has entered the idle state, either from power up, or from the end of a call sequence.

In step 101, the TYPE value is looked up from the non-volatile memory database 11 to determine if the TYPE is LS, GS, or if AUTO_CONFIG is desired. If the TYPE is LS or GS (i.e. the test is not to be performed), then the CONFIG is also forced to LS or GS and the trunk returns to a normal idle state (step 120), where it waits for a call action. If the trunk TYPE is AUTO_CONFIG, then program flow continues on to step 102.

In step 102, the volatile memory 12 corresponding to CONFIG is checked. If it is set to LS or GS, then the trunk returns to a normal idle state (step 120) and the value in CONFIG is used during operation of the trunk. If CONFIG is set to AUTO_DETECT, then the presence test is started (step 103).

In step 103, the trunk CONFIG is set to LS for the first portion of the test following which program flow continues to step 104.

In step 104, a termination is applied to the line (i.e. the equivalent of going off hook with a telephone), following which program flow continues to step 105.

In step 105, programmable timer A is started. This timer governs the maximum time to wait for the next portion of the test. A typical value for timer A is 5 seconds, following which program flow continues to step 106.

In step 106, a tone detector 16 is connected to the trunk. This may be implemented as either a digital or analog band pass filter covering a bandwidth equal to the expected dial tone provided by the CO. The tone detector 106 is constructed such that detection of a signal within the specified bandwidth for a programmable period of time, typically 200 milliseconds constitutes a pass.

Following successful detection of tone detector test (step 107), program flow continues to step 108. However, if timer A expires before tone is detected (step 121), program flow continues to step 122. If timer A has not expired, then program flow returns to step 107 thereby executing a continuous loop until an exit condition exists (i.e. timer A expires).

In step 108, the trunk is released by removing the termination. The trunk TYPE may optionally be changed to LS at this time (step 109) although it may also be left at AUTO_CONFIG if it is wished to retest at each power-up. At step 110, program flow returns to normal operation.

In step 122, it has been concluded that the trunk does not respond correctly to testing as an LS line (i.e. the LS test has failed). Consequently, the termination is released and the trunk CONFIG is set to GS. Program flow then continues to step 123.

In step 123, a ground is applied to the Ring lead of the trunk, following which program flows continues to step 124.

In step 124, programmable timer B is started. This timer governs the maximum time to wait for the CO to return the Tip ground signal. A typical value for this timer is 2 seconds.

If Tip ground is detected (step 125), program flow proceeds to step 126. If Timer B expires (step 140) program flow proceeds to step 142. If timer B has not expired, then program flow returns to step 125.

In step 126, the CO has responded to a ground start. Applying termination to the line continues the ground start. With termination applied, the Ring ground can be released (step 127) to complete the GS protocol.

Next, the IAD 1 attempts dial tone detection to complete the test. Thus, at step 128, timer A is started. This timer governs the maximum time to wait for the next portion of the test. A typical value for this is 5 seconds.

In step 129, tone detector 16 is connected to the trunk. As discussed above, this may be implemented as either a digital or analog band pass filter.

In the event that the tone detector passes (step 130), the software proceeds to step 131. If timer B expires, the software proceeds to step 142. If timer B has not expired, then program flow returns to step 130.

In step 131, the trunk is released by removing the termination, and the trunk TYPE may optionally be changed to GS. On the other hand, the trunk TYPE may also be left at AUTO_CONFIG if it is wished to retest at each power-up. The trunk is returned to normal operation in step 133.

By step 142, it has been determined that the test has failed. The trunk is released by removing the termination, the trunk CONFIG is changed to DISABLED, and the trunk is placed in a busied out state and made unavailable for use. During this state the IAD 1 periodically checks to see whether CONFIG has changed to AUTO_DETECT, in which case it returns to the idle state and retests the line.

Separate tasks check the CONFIG values periodically to determine the status of the trunks. Trunks that are disabled are indicated on the IAD 1 by flashing LED's. An active web page may periodically query the CONFIG values and report the same. Also, a call to a pre-programmed number may be made to send the results of the test via modem or DTMF codes. This call may be initiated by a pre-programmed DTMF code or by an entry from command line programming.

It will be appreciated that, although embodiments of the invention have been described and illustrated in detail, various changes and modifications may be made. For example, it is contemplated that a set of magnetically latching relays may be used to reverse the line polarity if the LS and GS configurations fail, after which the GS configuration is tested again. Furthermore, a loop current detector may be used instead of a tone detector. Also, a loop polarity detector may be used to verify polarity of the trunk. The test methodology may be applied as well to a DSL trunk to determine its presence and operation. More particularly, since DSL trunks use a portion of the total bandwidth only while a call is in progress, when the call is stopped the bandwidth is made available for data again. Various protocols are used to start and stop calls similar to those used with POTS lines. Some of these protocols provide a link status indicating that the DSL is working and connected to an operating voice gateway, in which case the trunks may be assumed to be operating. Some gateways do not provide the link status, and in these cases the test method according to the present invention may be applied to indicate that the link is up. Also, although it is preferable to perform the LS test before the GS test (i.e. the majority of lines are loop start where polarity is generally insignificant), it is possible to implement the invention with GS test before the LS test. All such changes and modifications may be made without departing from the sphere and scope of the invention as defined by the claims appended hereto.

What is claimed is:

1. A method of testing connection of customer premise equipment to a trunk, comprising:

setting a trunk configuration variable to one of either loop start or ground start;

starting a first timer for measuring a first elapsed time period;

initiating one of either a loop start test or a ground start test in the event that said trunk configuration variable has been set to loop start or ground start, respectively;

in the event that said loop start test or ground start test passes within said first elapsed time period then providing an indication that said customer premise equipment is connected to one of either a loop start trunk or ground start trunk, respectively; and otherwise setting said trunk configuration variable to the other of said loop start or ground start;

starting a second timer for measuring a second elapsed time period;

initiating the other of said loop start test or ground start test;

in the event that said other of said loop start test or ground start test passes within said second elapsed time period then providing an indication that said customer premise equipment is connected to said other of said loop start trunk or ground start trunk, respectively, and otherwise providing an indication that said trunk is disabled.

2. The method of claim 1, wherein said loop start test further comprises:

starting said first timer;

detecting the presence or absence of dial tone on said trunk, whereby the presence of dial tone within said first elapsed time period indicates that said loop start test has passed and the absence of dial tone indicates that said loop start test has failed; and releasing said termination.

3. The method of claim 1, wherein said ground start test comprises:

applying ring ground to said trunk;

starting said second timer;

detecting the presence or absence of tip ground on said trunk, whereby the presence of tip ground within said first elapsed time period indicates that a first portion of said ground start test has passed and the absence of tip ground indicates that said ground start test has failed;

in the event that the first portion of said ground start test has passed applying a termination to said trunk;

starting said first timer;

detecting the presence or absence of dial tone on said trunk, whereby the presence of dial tone within said first elapsed time period indicates that said ground start test has passed and the absence of dial tone indicates that said ground start test has failed; and releasing said termination.

4. The method of claim 1, further comprising setting a second trunk variable to one of either i) loop start, ii) ground start, or iii) auto_detect, for forcing said trunk to operate as one of either i) a loop start trunk, ii) a ground start trunk, or iii) automatically detecting whether said trunk is loop start or ground start.

5. The method of claim 1, wherein said first elapsed time period is programmable.

6. The method of claim 1, wherein said second elapsed time period is programmable.

7. An apparatus for testing connection of customer premise equipment to a trunk, comprising:

a user interface for receiving user commands from a remote location;

memory registers for storing indications of trunk type and status; and a controller for initiating automatic trunk tests responsive to said user commands and in response storing said indications of trunk type and status in said memory registers and outputting said indications to said user interface;

said controller executing a method for testing connection of customer premise equipment to a trunk;

said method including setting a trunk configuration variable to one of either loop start or ground start;

starting a first timer for measuring a first elapsed time period;

initiating one of either a loop start test or a ground start test in the event that said trunk configuration variable has been set to loop start or ground start, respectively; in the event that said loop start test or ground start test passes within said first elapsed time period then providing an indication that said customer premise equipment is connected to one of either a loop start trunk or ground start trunk, respectively; and otherwise setting said trunk configuration variable to the other of said loop start or ground start;

starting a second timer for measuring a second elapsed time period;

initiating the other of said loop start test or ground start test;

in the event that said other of said loop start test or ground start test passes within said second elapsed time period then providing an indication that said customer premise equipment is connected to said other of said loop start trunk or ground start trunk, respectively, and otherwise providing an indication that said trunk is disabled.

8. The method of claim 2, further comprising setting a second trunk variable to one of either i) loop start, ii) ground start, or iii) auto_detect, for forcing said trunk to operate as one of either i) a loop start trunk, ii) a ground start trunk, or iii) automatically detecting whether said trunk is loop start or ground start.

9. The method of claim 3, further comprising setting a second trunk variable to one of either i) loop start, ii) ground start, or iii) auto_detect, for forcing said trunk to operate as one of either i) a loop start trunk, ii) a ground start trunk, or iii) automatically detecting whether said trunk is loop start or ground start.

10. The apparatus of claim 7, wherein said method includes, setting a trunk configuration variable to one of either loop start or ground start;

starting a first timer for measuring a first elapsed time period;

initiating one of either a loop start test or a ground start test in the event that said trunk configuration variable has been set to loop start or ground start, respectively;

in the event that said loop start test or ground start test passes within said first elapsed time period then providing an indication that said customer premise equipment is connected to one of either a loop start trunk or ground start trunk, respectively; and otherwise setting said trunk configuration variable to the other of said loop start or ground start;

starting a second timer for measuring a second elapsed time period;

initiating the other of said loop start test or ground start test;

in the event that said other of said loop start test or ground start test passes within said second elapsed time period then providing an indication that said customer premise equipment is connected to said other of said loop start trunk or ground start trunk, respectively, and otherwise providing an indication that said trunk is disabled, starting said first timer;

detecting the presence or absence of dial tone on said trunk, whereby the presence of dial tone within said first elapsed time period indicates that said loop start test has passed and the absence of dial tone indicates that said loop start test has failed; and releasing said termination.

11. The apparatus of claim 7, wherein said method includes, setting a trunk configuration variable to one of either loop start or ground start;

starting a first timer for measuring a first elapsed time period;

initiating one of either a loop start test or a ground start test in the event that said trunk configuration variable has been set to loop start or ground start, respectively;

in the event that said loop start test or ground start test passes within said first elapsed time period then providing an indication that said customer premise equipment is connected to one of either a loop start trunk or ground start trunk, respectively; and otherwise setting said trunk configuration variable to the other of said loop start or ground start;

starting a second timer for measuring a second elapsed time period;

initiating the other of said loop start test or ground start test;

in the event that said other of said loop start test or ground start test passes within said second elapsed time period then providing an indication that said customer premise equipment is connected to said other of said loop start trunk or ground start trunk, respectively, and otherwise providing an indication that said trunk is disabled, applying ring ground to said trunk;

starting said second timer;

detecting the presence or absence of tip ground on said trunk, whereby the presence of tip ground within said first elapsed time period indicates that a first portion of said ground start test has passed and the absence of tip ground indicates that said ground start test has failed;

in the event that the first portion of said ground start test has passed applying a termination to said trunk;

starting said first timer;

detecting the presence or absence of dial tone on said trunk, whereby the presence of dial tone within said first elapsed time period indicates that said ground start test has passed and the absence of dial tone indicates that said ground start test has failed; and releasing said termination.

12. The apparatus of claim 7, wherein said method includes, setting a trunk configuration variable to one of either loop start or ground start;

starting a first timer for measuring a first elapsed time period;

initiating one of either a loop start test or a ground start test in the event that said trunk configuration variable has been set to loop start or ground start, respectively;

in the event that said loop start test or ground start test passes within said first elapsed time period then providing an indication that said customer premise equipment is connected to one of either a loop start trunk or ground start trunk, respectively; and otherwise setting said trunk configuration variable to the other of said loop start or ground start;

starting a second timer for measuring a second elapsed time period;

initiating the other of said loop start test or ground start test;

in the event that said other of said loop start test or ground start test passes within said second elapsed time period then providing an indication that said customer premise equipment is connected to said other of said loop start trunk or ground start trunk, respectively, and otherwise providing an indication that said trunk is disabled, setting a second trunk variable to one of either i) loop start, ii) ground start, or iii) auto_detect, for forcing said trunk to operate as one of either i) a loop start trunk, ii) a ground start trunk, or iii) automatically detecting whether said trunk is loop start or ground start.

13. The apparatus of claim 7, wherein said method includes, setting a trunk configuration variable to one of either loop start or ground start;

starting a first timer for measuring a first elapsed time period;

initiating one of either a loop start test or a ground start test in the event that said trunk configuration variable has been set to loop start or ground start, respectively;

in the event that said loop start test or ground start test passes within said first elapsed time period then providing an indication that said customer premise equipment is connected to one of either a loop start trunk or ground start trunk, respectively; and otherwise setting said trunk configuration variable to the other of said loop start or ground start;

starting a second timer for measuring a second elapsed time period;

initiating the other of said loop start test or ground start test;

in the event that said other of said loop start test or ground start test passes within said second elapsed time period then providing an indication that said customer premise equipment is connected to said other of said loop start trunk or ground start trunk, respectively, and otherwise providing an indication that said trunk is disabled, said first elapsed time period is programmable.

14. The apparatus of claim 7, wherein said method includes, setting a trunk configuration variable to one of either loop start or ground start;

starting a first timer for measuring a first elapsed time period;

initiating one of either a loop start test or a ground start test in the event that said trunk configuration variable has been set to loop start or ground start, respectively;

in the event that said loop start test or ground start test passes within said first elapsed time period then providing an indication that said customer premise equipment is connected to one of either a loop start trunk or ground start trunk, respectively; and otherwise setting said trunk configuration variable to the other of said loop start or ground start;

starting a second timer for measuring a second elapsed time period;

initiating the other of said loop start test or ground start test;

in the event that said other of said loop start test or ground start test passes within said second elapsed time period then providing an indication that said customer premise equipment is connected to said other of said loop start trunk or ground start trunk, respectively, and otherwise providing an indication that said trunk is disabled, said second elapsed time period is programmable.

15. The apparatus of claim 7, wherein said method includes, setting a trunk configuration variable to one of either loop start or ground start;

starting a first timer for measuring a first elapsed time period;

initiating one of either a loop start test or a ground start test in the event that said trunk configuration variable has been set to loop start or ground start, respectively;

in the event that said loop start test or ground start test passes within said first elapsed time period then providing an indication that said customer premise equipment is connected to one of either a loop start trunk or ground start trunk, respectively; and otherwise setting said trunk configuration variable to the other of said loop start or ground start;

starting a second timer for measuring a second elapsed time period;

initiating the other of said loop start test or ground start test;

in the event that said other of said loop start test or ground start test passes within said second elapsed time period then providing an indication that said customer premise equipment is connected to said other of said loop start trunk or ground start trunk, respectively, and otherwise providing an indication that said trunk is disabled, starting said first timer;

detecting the presence or absence of dial tone on said trunk, whereby the presence of dial tone within said first elapsed time period indicates that said loop start test has passed and the absence of dial tone indicates that said loop start test has failed; and releasing said termination, setting a second trunk variable to one of either i) loop start, ii) ground start, or iii) auto_detect, for forcing said trunk to operate as one of either i) a loop start trunk, ii) a ground start trunk, or iii) automatically detecting whether said trunk is loop start or ground start.

16. The apparatus of claim 7, wherein said method including, setting a trunk configuration variable to one of either loop start or ground start;

starting a first timer for measuring a first elapsed time period;

initiating one of either a loop start test or a ground start test in the event that said trunk configuration variable has been set to loop start or ground start, respectively;

in the event that said loop start test or ground start test passes within said first elapsed time period then providing an indication that said customer premise equipment is connected to one of either a loop start trunk or ground start trunk, respectively; and otherwise setting said trunk configuration variable to the other of said loop start or ground start;

starting a second timer for measuring a second elapsed time period;

initiating the other of said loop start test or ground start test;

in the event that said other of said loop start test or ground start test passes within said second elapsed time period then providing an indication that said customer premise equipment is connected to said other of said loop start trunk or ground start trunk, respectively, and otherwise providing an indication that said trunk is disabled, applying ring ground to said trunk;

starting said second timer;

detecting the presence or absence of tip ground on said trunk, whereby the presence of tip ground within said first elapsed time period indicates that a first portion of said ground start test has passed and the absence of tip ground indicates that said ground start test has failed;

in the event that the first portion of said ground start test has passed applying a termination to said trunk;

starting said first timer;

detecting the presence or absence of dial tone on said trunk, whereby the presence of dial tone within said first elapsed time period indicates that said ground start test has passed and the absence of dial tone indicates that said ground start test has failed; and releasing said termination, setting a second trunk variable to one of either i) loop start, ii) ground start, or iii) auto_detect, for forcing said trunk to operate as one of either i) a loop start trunk, ii) a ground start trunk, or iii) automatically detecting whether said trunk is loop start or ground start.

* * * * *